United States Patent
Joshi et al.

(10) Patent No.: US 9,157,460 B2
(45) Date of Patent: Oct. 13, 2015

(54) CONTROLLING A FLUID FLOW WITH A MAGNETIC FIELD

(75) Inventors: Shailesh N. Joshi, Ann Arbor, MI (US); Jaewook Lee, Namyangju Si (KR)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 131 days.

(21) Appl. No.: 13/489,106

(22) Filed: Jun. 5, 2012

(65) Prior Publication Data
US 2013/0318962 A1 Dec. 5, 2013

(51) Int. Cl.
| | |
|---|---|
| F15C 1/04 | (2006.01) |
| F15B 7/00 | (2006.01) |
| F16K 99/00 | (2006.01) |
| F16K 31/06 | (2006.01) |
| F16K 31/02 | (2006.01) |

(52) U.S. Cl.
CPC .............. *F15B 7/00* (2013.01); *F16K 31/0672* (2013.01); *F16K 99/0015* (2013.01); *F16K 99/0046* (2013.01); *B01L 2200/0673* (2013.01); *F16K 31/02* (2013.01); *Y10S 137/909* (2013.01)

(58) Field of Classification Search
CPC ............... F16K 2099/0084; F16K 99/0001; F16K 99/0046; F16K 99/0015; B01L 2200/0673; B01L 2400/043; Y01S 137/909
USPC ............... 137/251.1, 253, 827, 909; 251/65, 251/129.06; 188/268, 282.2
See application file for complete search history.

(56) References Cited

U.S. PATENT DOCUMENTS

| | | | | |
|---|---|---|---|---|
| 2,763,125 | A * | 9/1956 | Kadosch et al. | 60/230 |
| 3,477,948 | A | 11/1969 | Inoue | |
| 4,928,125 | A * | 5/1990 | Iino | 347/54 |
| 4,963,883 | A * | 10/1990 | Matsui | 347/48 |
| 4,967,831 | A | 11/1990 | Leland | |
| 5,396,802 | A * | 3/1995 | Moss | 73/722 |
| 5,826,883 | A * | 10/1998 | Cho et al. | 277/410 |
| 6,074,365 | A * | 6/2000 | Hahndel et al. | 604/151 |
| 6,290,894 | B1 * | 9/2001 | Raj et al. | 264/405 |
| 6,318,970 | B1 | 11/2001 | Backhouse | |
| 6,408,884 | B1 * | 6/2002 | Kamholz et al. | 137/827 |
| 6,415,821 | B2 * | 7/2002 | Kamholz et al. | 137/827 |
| 6,450,203 | B1 | 9/2002 | Backhouse et al. | |
| 7,204,581 | B2 | 4/2007 | Peeters | |
| 7,661,680 | B2 * | 2/2010 | Langberg | 277/629 |

(Continued)

FOREIGN PATENT DOCUMENTS

| | | |
|---|---|---|
| JP | 2003-83256 | 3/2003 |
| WO | 01/28682 A1 | 4/2001 |
| WO | 2008/067585 A1 | 6/2008 |

OTHER PUBLICATIONS

Han et al., "Coupled Magnetic Field and Viscoelasticity of Ferrogel," International Journal of Applied Mechanics, vol. 3, No. 2, 2011, pp. 259-278.

*Primary Examiner* — Matthew W Jellett
(74) *Attorney, Agent, or Firm* — Oblon, McClelland, Maier & Neustadt, L.L.P.

(57) ABSTRACT

A device, system and method for controlling the fluid flow of a process fluid in a tube with a magnetic field. A ferrogel can be included in the tube with the process fluid. A membrane can encapsulate the ferrogel. A mounting support can secure the membrane within the tube, and a magnetic field generator can generate the magnetic field to deform the membrane and the ferrogel from a natural position to a deformed position.

24 Claims, 10 Drawing Sheets

(56) References Cited

U.S. PATENT DOCUMENTS

| | | |
|---|---|---|
| 7,754,085 B2 | 7/2010 | Long et al. |
| 8,302,327 B2 * | 11/2012 | Battlogg .......................... 36/29 |
| 8,403,292 B2 * | 3/2013 | Oh et al. ........................ 251/11 |
| 8,451,080 B2 * | 5/2013 | Lee et al. ...................... 335/281 |
| 8,522,751 B2 * | 9/2013 | DeLeon ........................ 123/458 |
| 2005/0069424 A1 | 3/2005 | Lu et al. |
| 2011/0250993 A1 * | 10/2011 | VanDelden .................... 473/409 |
| 2012/0275929 A1 * | 11/2012 | Salsman ........................ 417/53 |

* cited by examiner

LOW-SPEED ULM (1 m)

AIRLINER (8 m)

PROPELLER BLADE (15 cm)

SUPERSONIC INTERCEPTOR (2 m)

BLACKBIRD (6 cm)

TURBOFAN FAN BLADE (80 cm)

DRAGONFLY WING (12 mm)

TURBINE BLADE (8 cm)

DOLPHIN FLIPPER FIN (10 cm)

SAILBOAT (3 m)

CONTROLLING A FLUID FLOW WITH A MAGNETIC FIELD

BACKGROUND

Fluid handling devices to control fluid flow, including pumps and valves, can be fabricated using techniques similar to those found in applications pertaining to integrated circuits. These devices can be applied to a system to control a fluid flow. Known techniques include devices using magnetically actuated slugs made of a magnetic fluid, a ferrogel, to control a process fluid through a channel. A ferrogel can be prepared by introducing magnetic particles, such as magnetic metal particles, into a gel. A deformable ferrogel can be used in a micro-pump or a micro-valve.

SUMMARY OF ILLUSTRATIVE EMBODIMENTS

One aspect of this disclosure describes a device for controlling the fluid flow of a process fluid in a tube by way of a ferrogel. The ferrogel can be encapsulated in a membrane. A mounting support can secure the membrane within the tube, and a magnetic field generator can generate a magnetic field to deform the membrane and the ferrogel from a natural position to a deformed position. The membrane can have a natural position in the shape of a foil or a sphere, where the magnetic field generator can be configured to generate the magnetic field so as to adjust a surface of the foil shaped membrane or the sphere shaped membrane. Further, the magnetic field generator can be configured to selectively modify a first surface of the foil shaped membrane without modifying a second surface of the foil shaped membrane so that only the first surface of the foil shaped membrane is modified. The magnetic field generator can include a plurality of individually controlled magnetic field generating sources, where a controller can be provided to control operation of the magnetic field generating sources.

An elasticity of the membrane can return the membrane and the ferrogel to a natural position after the magnetic field is removed, where the membrane and the ferrogel can be deformed to a deformed position by the magnetic field so as to modify a flow of a process fluid in the tube. A mounting support can secure the membrane to a center of a cross section of the tube.

A magnetic field generator can generate a magnetic field to cause the membrane and the ferrogel to expand radially outward toward walls of the tube from a natural position to an expanded deformed position to decrease a flow rate of the process fluid. This expanded deformed position can decrease a length of the membrane and the ferrogel in a flow direction of the process fluid. The magnetic field generator can also generate a magnetic field to cause the membrane and the ferrogel to contract radially inward toward a center of the tube from a natural position to a contracted deformed position to increase a flow rate of the process fluid. This contracted deformed position can increase a length of the membrane and the ferrogel in a flow direction of the process fluid. In these aspects, different magnetic fields can be generated through the use of different physically arranged magnets and/or can be achieved by generating the magnetic field differently by varying a flow of current to the magnet(s).

An implementation of the teachings of this disclosure can include a micro-valve, a micro-pump or a macro-scale test chamber. The membrane can be a visco elastic soft polymer and the ferrogel can be non-elastic. An implementation of teachings of this disclosure can include fluid control in an automotive engine, and can be used in fuel injection and/or coolant control. Further, the ferrogel may not be encapsulated by a membrane. The above-presented aspects may be implemented separately or in combination with each other.

BRIEF DESCRIPTION OF THE DRAWINGS

A more complete appreciation of the disclosed embodiments and many of the attendant advantages thereof will be readily obtained as the same becomes better understood by reference to the following detailed descriptions when considered in connection with the accompanying drawings, wherein.

DETAILED DESCRIPTION

Figure 1A:
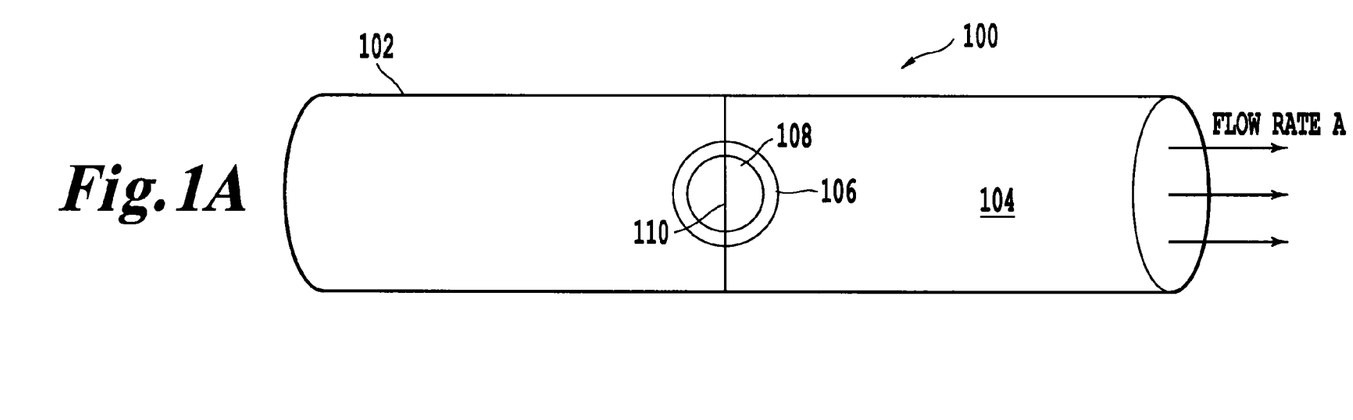
FIG. 1A is a side view of a device with no magnetic field applied to a membrane encapsulated ferrogel.

As shown in FIG. 1A, a device 100 includes a tube 102 containing a process fluid 104.

Within the tube 102, there is a membrane 106 encapsulating a ferrogel 108 that is mounted to a center of the tube 102 via a mounting support 110. The mounting support 110 secures the membrane 106 to a center of a cross section of the tube 102. The mounting support 110 can be made of a non-magnetic material and it's size will be governed by the size of the tube 102. In alternative aspects, the ferrogel 108 is not encapsulated by a membrane 106. For this aspect, not shown in the figures, the ferrogel 108 can have a doughnut hole that is secured to the mounting support 110.

FIG. 1A shows the membrane 106 and the ferrogel 108 at a natural position which allows the process fluid 104 to flow at a natural flow rate A through the tube 102. In this example, the membrane 106 is a visco elastic soft polymer and the ferrogel 108 is non-elastic (deformable). Further, although the tube 102 is shown as having circular cross-sectional shape, other cross-sectional shapes are available, including polygonal and elliptical. In the shown example, the cross-sectional shape of the membrane 106 and/or the ferrogel 108 has a circular or curved shape which corresponds with the cross-sectional shape of the tube 102. In other examples, not shown, the cross-sectional shape of the membrane 106 and/or the ferrogel 108 has a shape which intentionally provides gaps and/or non-sealing edges with the interior wall of the tube 102. In such examples, the membrane 106 and/or the ferrogel 108 can have some edges which contact the interior wall of the tube 102, while other edges do not, based on the magnetic field applied to the membrane 106 and/or the ferrogel 108.

Figure 1B:
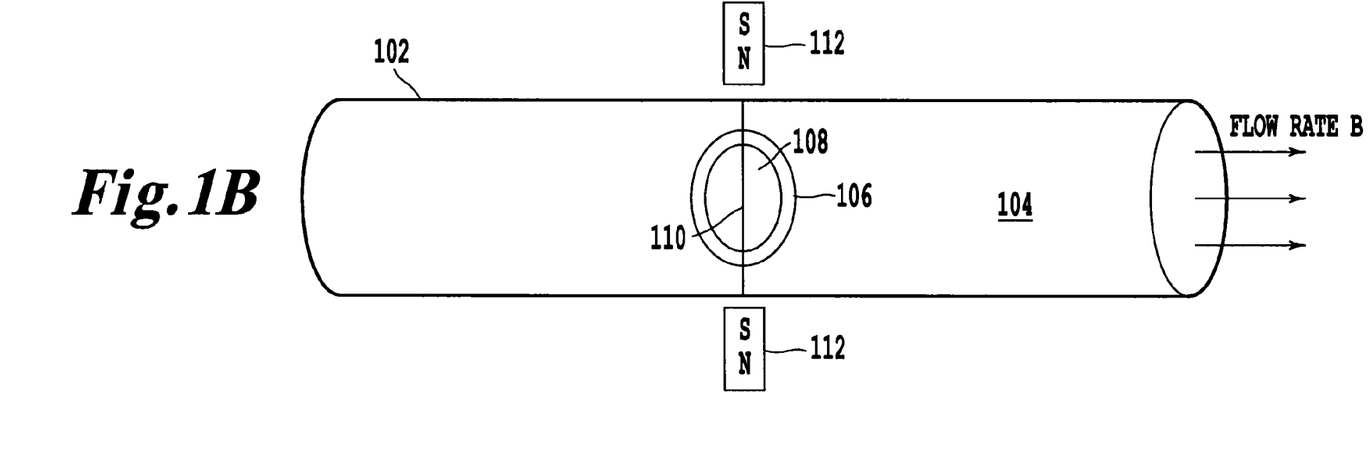
FIG. 1B is a side view of a device with a magnetic field applied to the membrane encapsulated ferrogel.

Adverting back to the shown example, as shown in FIG. 1B, a magnet 112 generates a magnetic field which deforms the ferrogel 108 so as to modify the flow rate of the process fluid 104 within the tube 102. FIG. 1B shows that the magnet 112 has deformed the ferrogel 108 to a deformed position which slows the flow rate of the process fluid 104 to a flow rate B. In the non-limiting embodiment shown, the flow rate B is less than the natural flow rate A because the deformed position of the ferrogel 108 restricts the flow of the process fluid 104. In effect, according to this example, the cross-sectional area of the tube 102 available for process fluid flow is reduced when the magnetic field is generated. As a result, the flow of the process fluid 104 is restricted when the magnetic field is generated in comparison to when the magnetic field is not generated. In another example, not shown, a magnetic field can be generated which deforms the ferrogel 108 so as create a complete or partial seal, based on a desired control, between an outer edge of the ferrogel 108 and/or the membrane 106 and an interior wall of the tube 102.

Once the magnet 112 stops applying a magnetic field, the elasticity of the membrane 106 returns the membrane 106 and the ferrogel 108 to the natural position where it can resume the natural, unrestricted or less-restricted flow rate A. The elasticity of the membrane 106 can be varied to provide variable rates of returning to the natural position.

FIGS. 1A-1B show various principles of operation of aspects of this disclosure. In some aspects, there is a need to control fluid on the micro scale without the use of mechanical action. A magnetically controlled ferrogel micro-valve can meter fluid more precisely and more accurately than a mechanical or electro-mechanical valve can. Further, a device without mechanical parts will have better reliability than a mechanical device.

Figure 2:
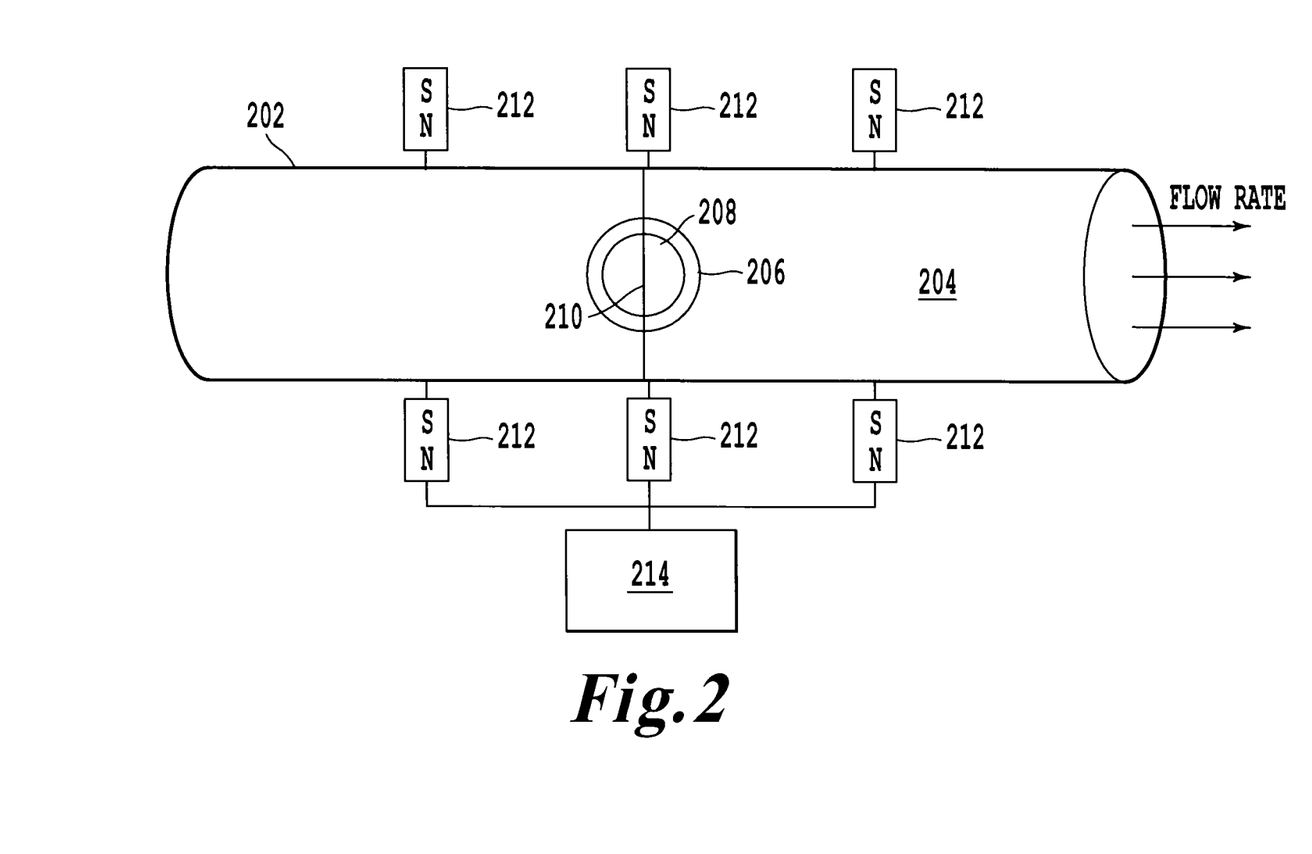
FIG. 2 is a side view of a system including a controller and a plurality of magnetic field generators.

FIG. 2 illustrates another embodiment of this disclosure, where there are multiple magnets 212, whose operations are controlled by a controller 214. The controller 214 embodies an exemplary magnetic field generator when coupled with the magnet(s) 212. The controller 214 can independently control each of the magnets 212 in order to selectively deform the membrane 206 and the ferrogel 208 to a shape that accurately meters the process fluid 204 to a desired flow rate. Further, the controller 214 can be a programmable device to make the process automatic.

As per the arrangement shown in FIG. 2, the membrane 206 and ferrogel 208 can be manipulated in a myriad of ways to attain multiple flow profiles and/or flow rates. A system of magnets 212 whose operation is controlled by a controller 214 is one non-limiting embodiment that makes these numerous deformations possible. In other aspects, separate controllers and/or different magnets are utilized. For instance, the structure of separate magnets can be altered to provide a combination of uniform and non-uniform magnetic fields. Combinations of controllers and magnets can allow for specialized and detailed deformations of various surfaces of the ferrogel 208 and ultimately different flow profiles and/or flow rates of the process fluid 204, and although not shown explicitly in combination with the other disclosed aspects, can be combined therewith.

Figure 3A:
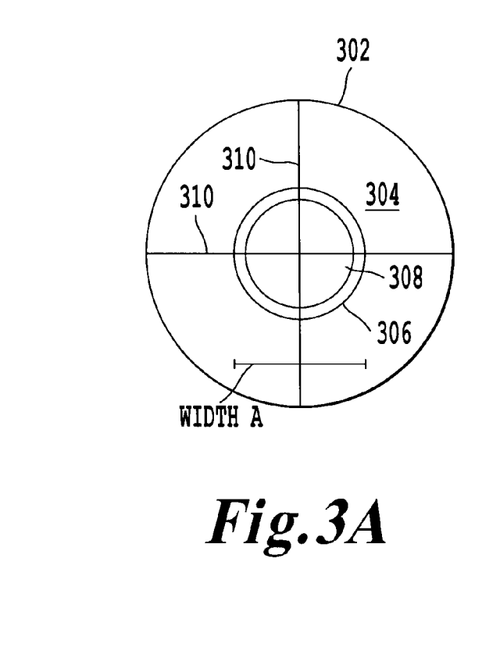
FIG. 3A is a down tube view of a device with no magnetic field.
Figure 3B:
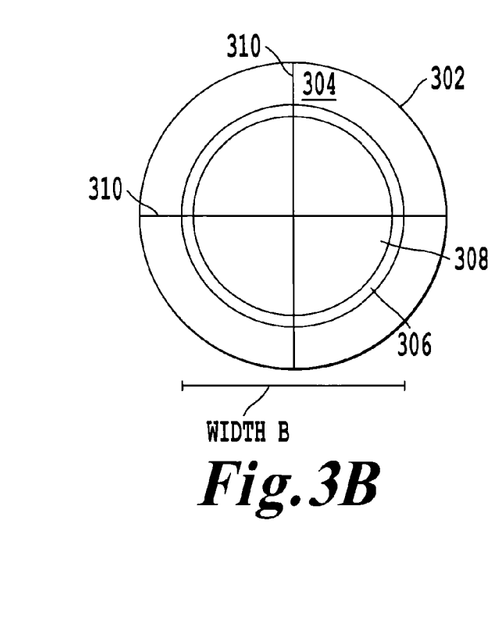
FIG. 3B is a down tube view of the device of FIG. 3A with a magnetic field B.
Figure 3C:
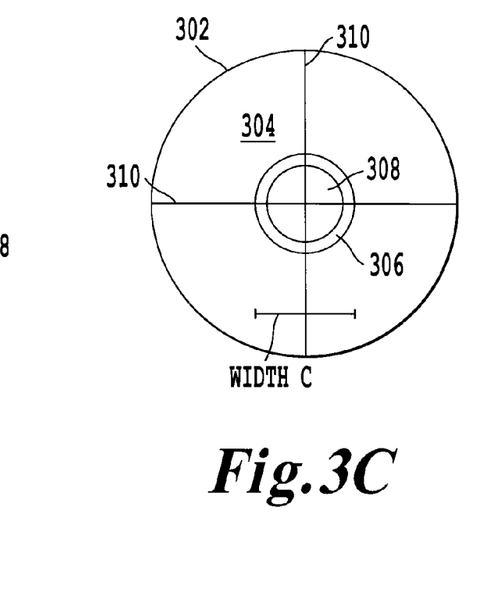
FIG. 3C is a down tube view of the device of FIG. 3A with a magnetic field C.

FIGS. 3A-3C are an extension of the principles described in FIGS. 1A-1B, where a flow rate is controlled by deforming the ferrogel 308. FIGS. 3A-3C illustrate down tube views which show that it is possible to increase or decrease a flow rate of the process fluid 304, with respect to the natural flow rate, in the tube 302. For simplicity, aspects of the magnetic field generator(s) are not shown in FIGS. 3A-4C. FIG. 3A shows the membrane 306 and the ferrogel 308 in a natural position A due to the lack of a magnetic field which allows the process fluid 304 to flow at a natural flow rate A. The width of the membrane 306 and the ferrogel 308 at the natural position A is a width A. FIG. 3B shows the ferrogel 308 in an expanded deformed position B, similar to the position shown in FIG. 1B, due to a magnetic field B which allows the process fluid 304 to flow at an expanded deformed flow rate B. The width of the membrane 306 and the ferrogel 308 at the expanded deformed position B is a width B. FIG. 3C shows the ferrogel 308 in a contracted deformed position C due to a magnetic field C which allows the process fluid 304 to flow at a contracted deformed flow rate C. The width of the membrane 306 and the ferrogel 308 at the contracted deformed position C is a width C.

Figure 4A:
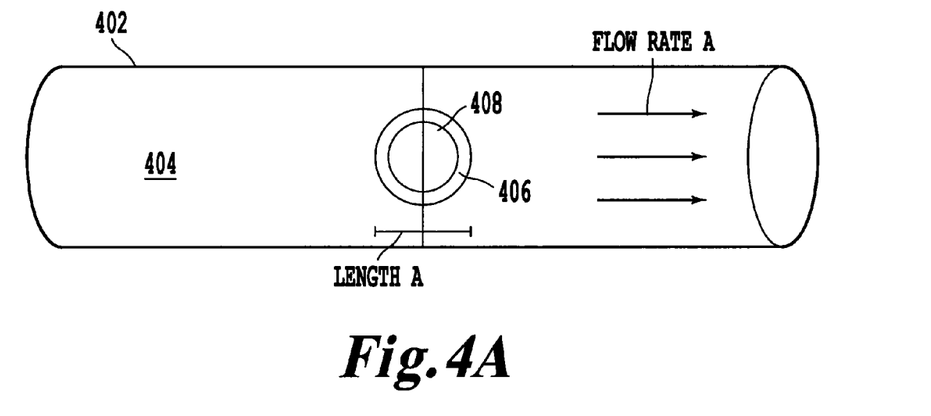
FIG. 4A is a side view of the device depicted in FIG. 3A.
Figure 4B:
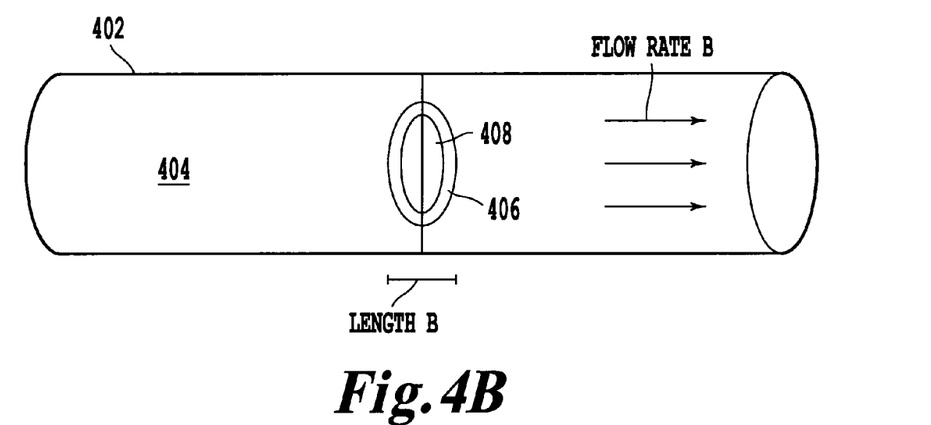
FIG. 4B is a side view of the device depicted in FIG. 3B.
Figure 4C:
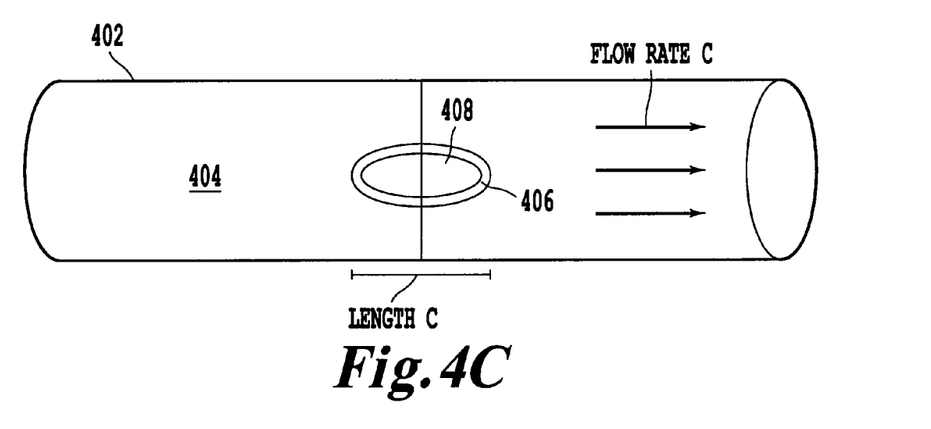
FIG. 4C is a side view of the device depicted in FIG. 3C.

FIGS. 4A-4C correspond to FIGS. 3A-3C, respectively, and illustrate respective side views of the membrane 406 and the ferrogel 408 in the natural position A, expanded deformed position B and expanded contracted position C, as described above. From the side views of FIGS. 4A-4C, it can be seen how the process fluid 404 is affected by the length of the deformed ferrogel 408. The length of the ferrogel 408 at the natural position A shown in FIG. 4A is a length A due to a lack of a magnetic field. The length of the ferrogel 408 at the expanded deformed position B shown in FIG. 4B is a length B due to a magnetic field B. The length of the ferrogel 408 at the contracted deformed position C shown in FIG. 4C is a length C due to a magnetic field C.

The length and width of the membrane 306/406 and the ferrogel 308/408 at the natural position A, expanded deformed position B and expanded contracted position C, as described above, influence or control the flow profile and the flow rate of the process fluid 304/404 in the tube 302/402. Also, it should be appreciated that the arrows in FIGS. 4A-4C indicate fluid flow magnitude and direction of the flow rates A-C. They do not indicate flow profile and other flow characteristics. As shown in FIGS. 3C and 4C, when the ferrogel 308/408 is in a contracted deformed position C, being longer and less wide than at the natural position A, the flow rate increases. Therefore, flow rate C is greater than flow rate A. Conversely, as shown in FIGS. 3B and 4B, when the ferrogel 308/408 is in an expanded deformed position B, being shorter and wider than at the natural position A, the flow rate decreases. Therefore, flow rate B is less than flow rate A. The system shown in FIG. 2, for example, can manipulate the ferrogel 308/408 in order to increase or decrease the flow rate, as shown at least in FIGS. 3A-4C.

Additionally, although not disclosed in the figures, the expanded deformed position B can expand to such a state where the ferrogel 308/408 can be in complete contact with the inner surface of the tube 302/402. This position, a fully expanded position, can completely seal the ferrogel 308/408 to the inner surface of the tube 302/402 and can effectively stop the flow of the process fluid 304/404.

Figure 5:
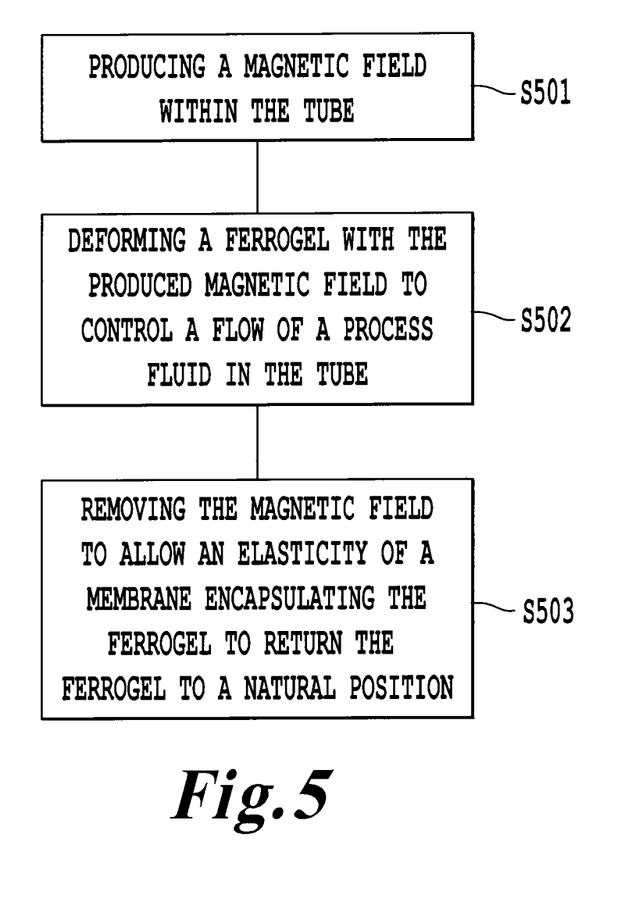
FIG. 5 is a flow chart of an algorithm for a device and/or a controller for controlling fluid flow in a tube.

FIG. 5 illustrates an algorithm for controlling fluid flow in a tube, which can be executed with the device/systems shown in the preceding figures. The first step, S501, is producing a magnetic field within the tube. As previously discussed, the strength and profile of the magnetic field is selected based on the manner in which the flow of the process fluid is to be controlled. The second step, S502, is deforming a ferrogel with the produced magnetic field to control a flow of the process fluid in the tube. The deformation of the ferrogel corresponds to the characteristics of the magnetic field generated by a magnetic field generator, which can include one or more magnets and one or more controllers. As previously discussed, the ferrogel can be deformed to change the profile and/or to increase or decrease the flow rate of the process fluid in the tube. After the process fluid is controlled for the desired amount of time, the third step, S503, is removing the magnetic field from the tube to allow the elasticity of a membrane encapsulating the ferrogel to return the ferrogel to a natural position. This also allows the flow rate of the process fluid to return to the state it operated in previous to the initiation of the magnetic field. FIG. 5 shows the entire process of controlling a fluid within a tube. This full actuation cycle would make the device/system similar to a valve. A valve acting as described, in a non-limiting embodiment, could be used in a cooling system for an automotive engine or to control fuel flow rates.

Figure 6:
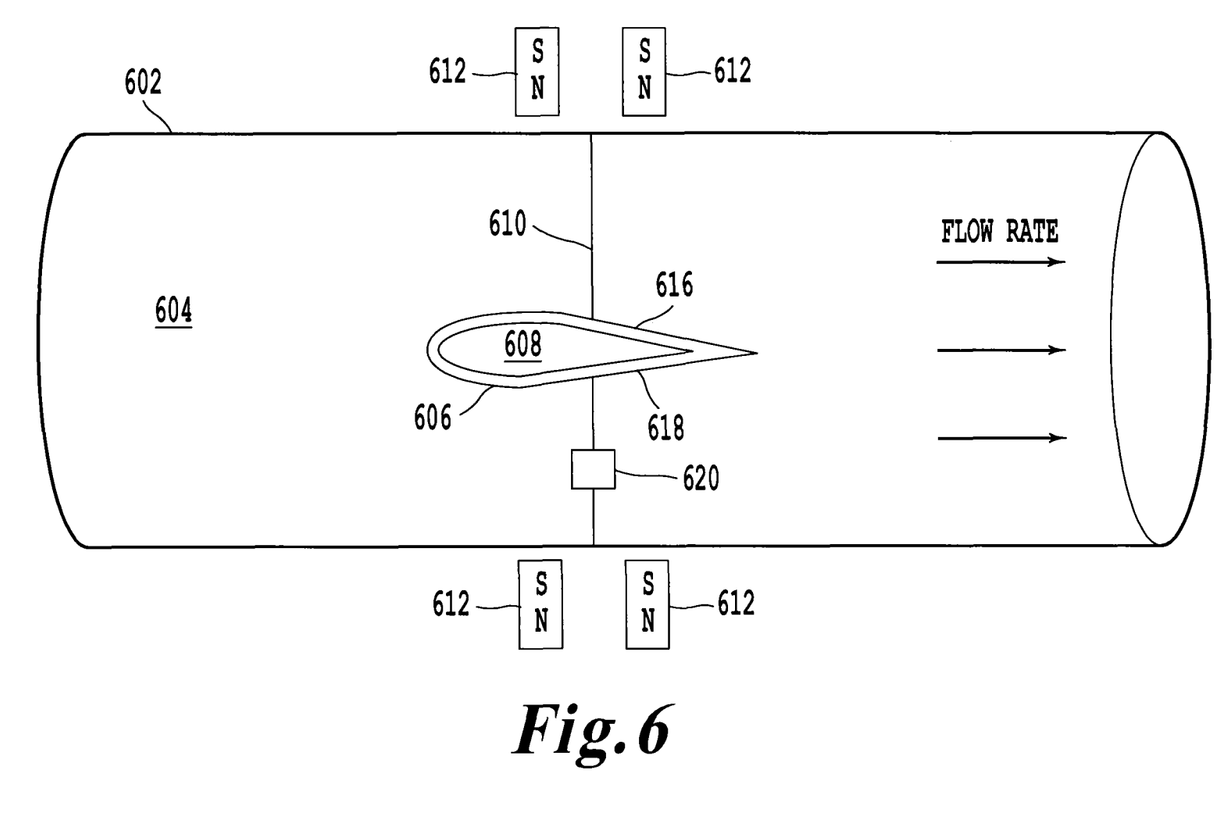
FIG. 6 is a side view of the device where the membrane is in a shape of a first foil.

FIG. 6 shows another non-limiting embodiment of the present disclosure where the membrane 606 and the ferrogel 608 are in the shape of a foil. A foil being defined as an airfoil, a hydrofoil or any object that when placed in a moving fluid, creates curved, streamlined flow profile lines which result in lower pressure on one side and higher pressure on the other side of the foil. This pressure difference is accompanied by a velocity difference and can manipulate the flow and/or profile of the fluid in the tube. Using magnets 612 to produce a magnetic field, it is possible to use the foil as a testing model for various foil shapes. The magnets 612 can adjust the surfaces 616/618 of the foil to a desired position or they can shape where a flow rate of the process fluid 604 or where a force applied to the foil can be measured.

There are multiple applications for a testing model of this nature. For example, turbine fans, propeller blades, aircraft wings, etc. can all be tested and a design for such foils can be optimized on a scaled down model which can greatly reduce cost and time. A sensor 620 can be used to measure force, torque, flow rate, flow profile, etc. in order to better shape the surfaces 616/618 of the foil to obtain the desired flow characteristics. Multiple sensors can be provided at various positions throughout the tube. Sensors can also be attached to the mounting support 610 in order to obtain information about the fluid 604 passing at that location. Although not shown in FIG. 6, sensors could be attached to the tube or directly on the foil itself.

Various materials for every component of the testing apparatus can be changed out and studied to observe the way they effect the measured characteristics. Using different materials for the membrane 606 can result in different friction coefficients, different flow conditions based on the friction coefficients and different return times for the foil to its natural position based on the membrane's elasticity. Various visco elastic soft polymers can be tested as the membrane. The ferrogel can be exchanged for another with a higher concentration of magnetic particles or for another with a different density of the gel. Varying the traits of the ferrogel will result in different reactions to the magnetic field which will alter the flow of the process fluid.

Different process fluids can be observed corresponding to different applications. These could include coolant for an automotive engine or water. The process fluids could be tested at varying temperatures and pressures that correlate with real life scenarios. A micro valve could be tested using engine coolant in a hot environment simulating a running automotive engine. Further still, changing the process fluid from a liquid to a gas can allow for the foil to be tested in a different environment completely. For example, a foil shape could be tested in a cold environment and low pressure simulating an airplane wing. The size, shape and material of the tube/channel that houses the process fluid can be manipulated to obtain the optimal features. For example, a rubber that would be used in a coolant tube in an automotive engine could be tested with the flow control device inside. As previously discussed, the type and magnitude of the magnetic field and the magnets used to achieve the desired magnetic field can be tested on a smaller scale. The mounting support can be interchanged to experiment with foil reaction to different support geometries and materials. The value of a testing apparatus described in the present disclosure is high due to the countless number of alterations that can be made to the apparatus on a smaller scale, with less resources and with greater efficiency.

Figure 7:
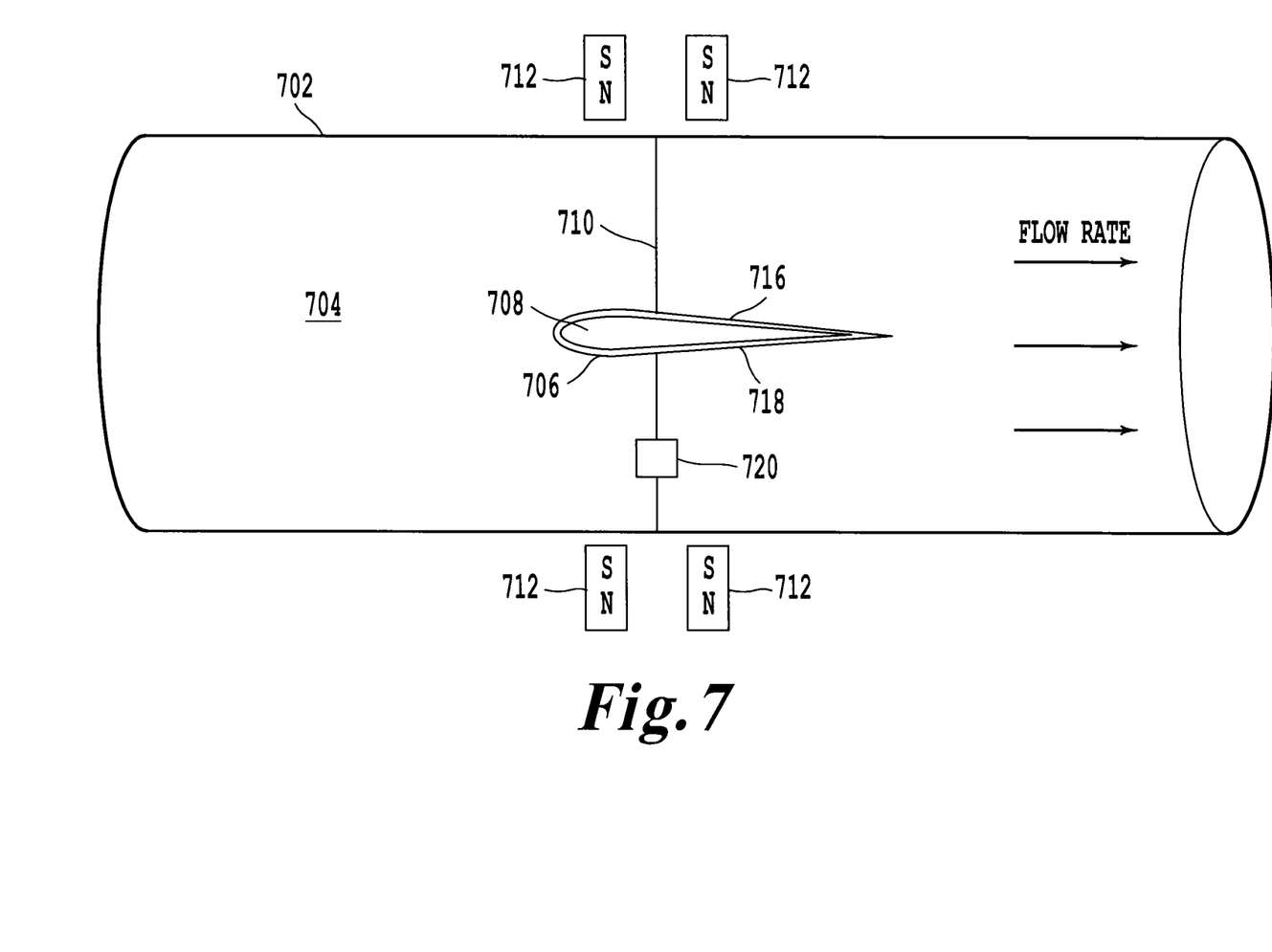
FIG. 7 is a side view of the device where the membrane is in a shape of a second foil.

FIG. 7 shows a testing module according to the prior descriptions where the membrane 706 and the ferrogel 708 are compressed by a magnetic field generated by magnets 712 to resemble a different shape of a foil. In the non-limiting example shown, the flow rate in FIG. 7 is higher than the flow rate in FIG. 6 due to the slimmer foil shape.

Figure 8:
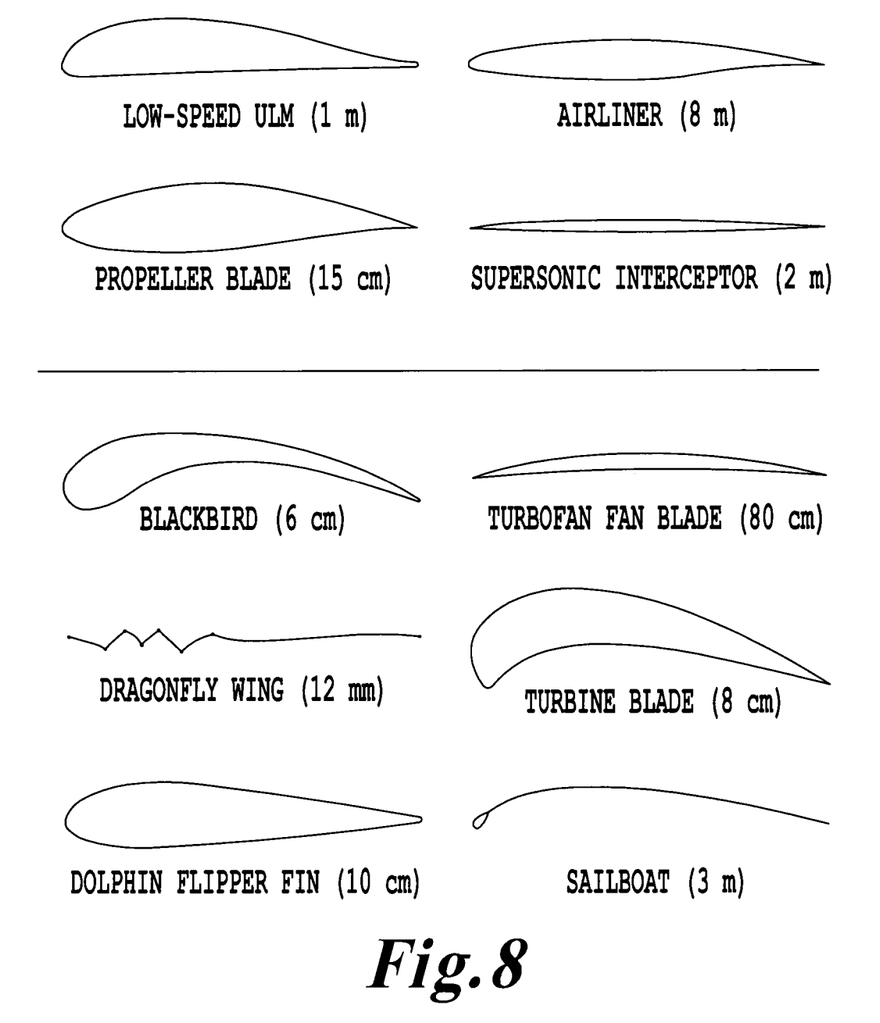
FIG. 8 illustrates various foil shapes.

FIG. 8 shows examples of various foil shapes that the membrane and the ferrogel could take in order to modify the flow characteristics of the process fluid in the tube. The specific characteristics of these foil shapes can be determined on a smaller scale using the testing apparatus disclosed in FIGS. 6-7. For example, it would be advantageous to optimize the profile and shape of an airliner wing on a smaller scale in order to reduce cost, time and materials. In testing a foil shape, only one surface can be changed at a time or multiple surfaces can be changed. Specific surface deformation of a foil can be controlled by the magnetic field applied to the tube.

Figure 9:
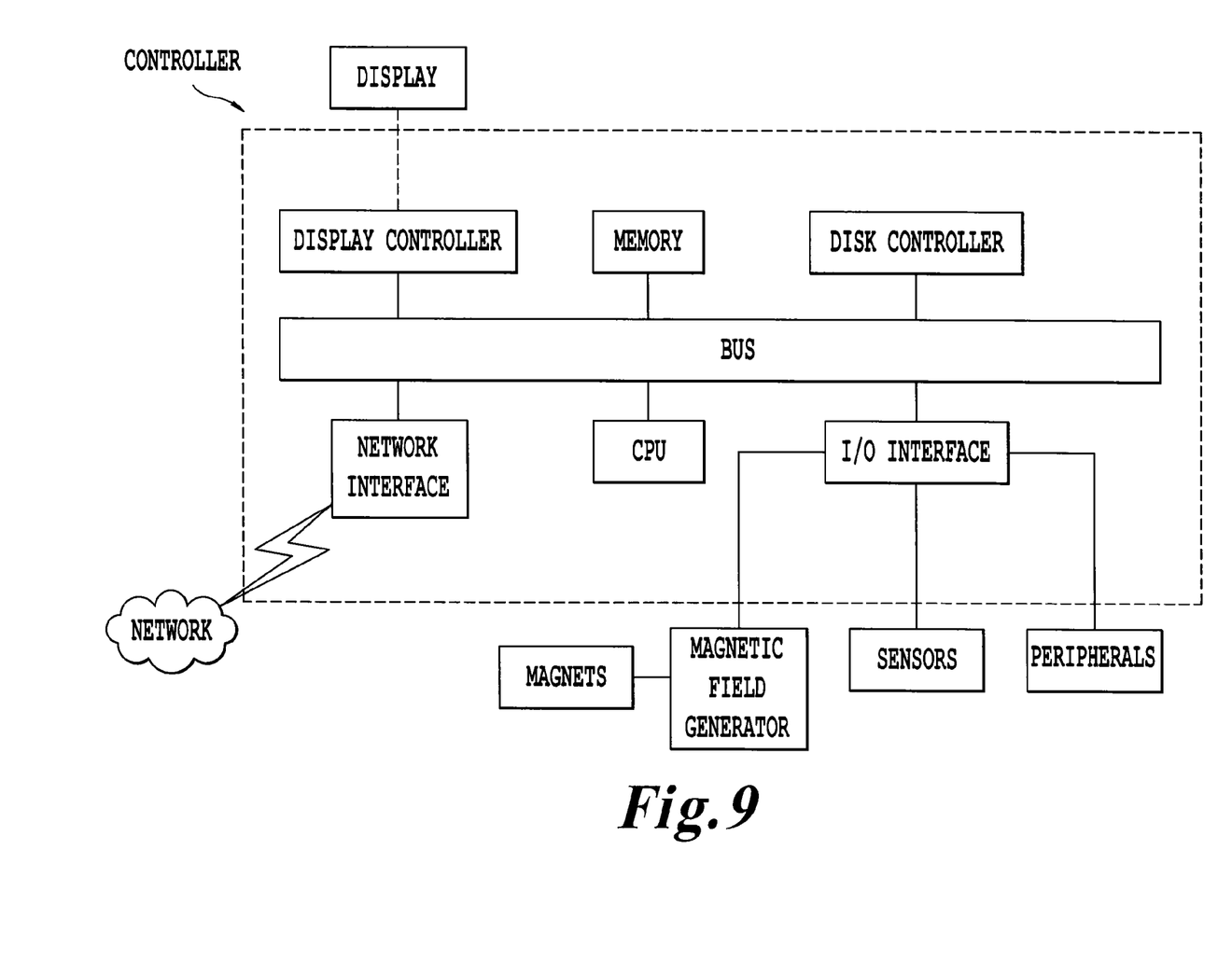
FIG. 9 is a schematic of a controller according to various aspects of this disclosure.

FIG. 9 shows an example of a controller to control the magnetic field in the previous examples discussed. The controller includes a memory, a disk controller, a bus, a network interface, a CPU, a display controller and an I/O interface. The display controller can control a display which may to display results to a user. The I/O interface can be used to take input information from peripherals (touch screen, keyboard, mouse, etc) and sensors (force, flow, etc).

The I/O interface can also be utilized to output instructions and/or control signals to a magnetic field generator. This can be in the form of instructions pertaining to electrical currents to be sent to various magnets throughout the system. The network interface can work with a network in the form of a vehicle local area network (VLAN).

Figure 10:
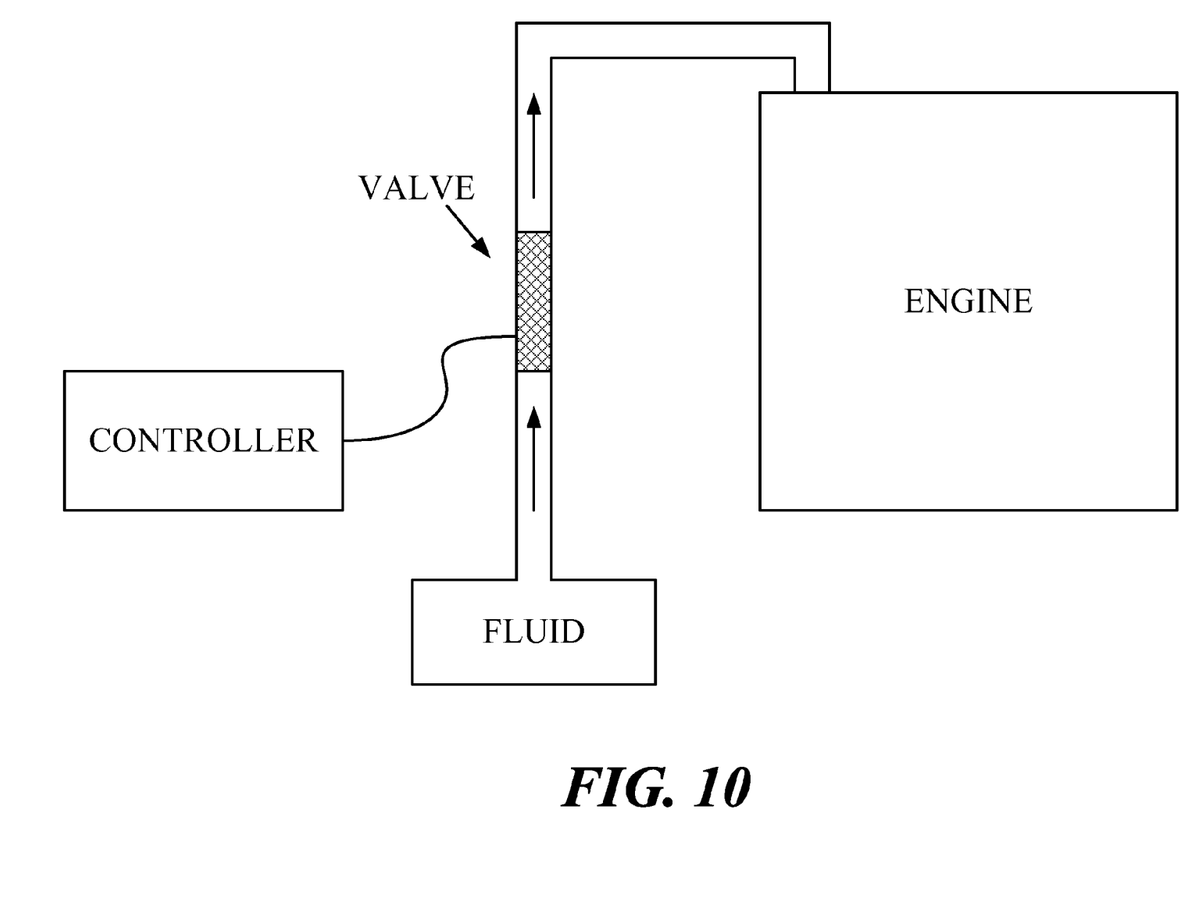
FIG. 10 is a schematic of a system for an automotive engine that utilizes a magnetic field valve.

FIG. 10 illustrates an exemplary cooling system or fuel system for a automotive engine. Cooling fluid or fuel is storated in a fluid reservoir and input to the engine via a valve controlled by a controller, such as the exemplary controller illustrated in FIG. 9. the valve can operate based on manipulated by magnetic field, in accordance with the algorithm of FIG. 5 and/or in accordance with examples illustrated in FIGS. 1-4 and 6-8.

Obviously, numerous modifications and variations of the present disclosure are possible in light of the above teachings. Any combination of the above-noted embodiments may be used. It is therefore to be understood that within the scope of the appended claims, the disclosure may be practiced otherwise than as specifically described herein.

The invention claimed is:
1. A device, comprising:
a tube including a process fluid;
a membrane encapsulating a ferrogel;
a mounting support to secure the membrane within the tube; and
a magnetic field generator to generate a magnetic field to deform the ferrogel from a natural position to a deformed position to modify fluid flow of the process fluid in the tube between the membrane and the tube, wherein, upon the magnetic field generator the magnetic field, the ferrogel moves radial inward toward a center of the tube from the natural position to the deformed position.

2. The device according to claim 1, wherein the membrane has a natural position in the shape of a foil.

3. The device according to claim 2, wherein the magnetic field generator is configured to generate the magnetic field so as to adjust a surface of the foil shaped membrane.

4. The device according to claim 3, wherein the magnetic field generator is configured to selectively modify a first surface of the foil shaped membrane without modifying a second surface of the foil shaped membrane.

5. The device according to claim 1, wherein the magnetic field generator includes:
a plurality of individually controlled magnetic field generating sources; and
a controller to control operation of the magnetic field generating sources.

6. The device according to claim 1, wherein an elasticity of the membrane returns the membrane and the ferrogel to the natural position after the magnetic field is removed.

7. The device according to claim 1, wherein the mounting support secures the membrane to a center of a cross section of the tube.

8. The device according to claim 1, wherein, upon the magnetic field generator generating a magnetic field, the membrane encapsulating the ferrogel expand radially outward toward walls of the tube away from a center of the tube from the natural position to an expanded deformed position to decrease a flow rate of the process fluid.

9. The device according to claim 8, wherein the expanded deformed position decreases a length of the membrane encapsulating the ferrogel in a flow direction of the process fluid.

10. The device according to claim 1, wherein the movement of the ferrogel radially inward toward the center of the tube from the natural position to the deformed position increases a flow rate of the process fluid.

11. The device according to claim 10, wherein the deformed position increases a length of the membrane encapsulating the ferrogel in a flow direction of the process fluid.

12. The device according to claim 1, wherein the device is a micro-valve.

13. The device according to claim 1, wherein the membrane is a visco elastic soft polymer and the ferrogel is non-elastic.

14. The device according to claim 1, wherein the magnetic field generator is configured to generate a plurality of magnetic fields, each of the magnetic fields resulting in a different deformed opposition of the membrane encapsulating the ferrogel to provide a plurality of different modifications to the fluid flow of the process fluid in the tube between the membrane and the tube.

15. A method, comprising:
flowing a process fluid in a tube at a flow rate;
producing a magnetic field within the tube;
deforming a ferrogel within the tube with the produced magnetic field from a natural position to a deformed position to control the fluid flow in the tube based on the deformed position of the ferrogel within the tube and to modify the flow rate of the process fluid between the membrane and the tube; and
generating a first magnetic field to move the ferrogel radially inward toward a center of the tube from the natural position to the deformed position.

16. The method according to claim 15, wherein the magnetic field is produced by a magnetic field generator including:
a plurality of individually controlled magnetic field generating sources; and
a controller to control operation of the magnetic field generating sources.

17. The method according to claim 15, further comprising:
after the ferrogel is in the deformed position, removing the magnetic field to allow an elasticity of a membrane encapsulating the ferrogel to return the membrane encapsulating the ferrogel to the natural position.

18. The method according to claim 17, wherein a natural position of the membrane in the shape of a foil.

19. The method according to claim 18, wherein the magnetic field generator is configured to generate the magnetic field so as to adjust a surface of the foil shaped membrane.

20. The method according to claim 19, wherein the magnetic field generator is configured to selectively modify a first surface of the foil shaped membrane without modifying a second surface of the foil shaped membrane.

21. The method according to claim 15, wherein generating the first magnetic field increases a flow rate of the process fluid between the membrane and the tube.

22. The method according to claim 21, further comprising generating a second magnetic field to move the ferrogel radially outward toward walls of the tube from the natural position to an expanded deformed position to decrease a flow rate of the process fluid between the membrane and the tube.

23. A device for controlling fluid flow of a process fluid in a tube, comprising:
means for producing a magnetic field within the tube to deform a membrane encapsulating a ferrogel within the tube from a natural position to a deformed position; and
means for controlling the fluid flow in the tube for modifying the fluid flow in the tube between the membrane and the tube, based on the deformed position of the membrane encapsulating the ferrogel within the tube,
wherein, upon the means for producing the magnetic field generating the magnetic field, the ferrogel moves radially inward toward a center of the tube from the natural position to the deformed position.

24. A device, comprising:
a tube including a process fluid;
a ferrogel;
a membrane encapsulating the ferrogel;
a mounting support to secure the membrane within the tube;
a magnetic field generator to generate a magnetic field to deform the ferrogel from a natural position to a deformed position, wherein
the membrane encapsulating the ferrogel has a natural position in the shape of a foil
the magnetic field generator is configured to generate the magnetic field so as to adjust a surface of the foil, and
the surface of the foil is adjusted to modify the flow rate of the process fluid between the membrane and the tube,
upon the magnetic field generator generating the magnetic field, the ferrogel moves radially inward toward a center of the tube from the natural position to the deformed position to adjust the surface of the foil.

* * * * *